(12) United States Patent
Quigley

(10) Patent No.: US 8,400,873 B2
(45) Date of Patent: Mar. 19, 2013

(54) VIBROSEIS SEISMIC ACQUISITION TECHNIQUE

(75) Inventor: John Quigley, Redhill (GB)

(73) Assignee: WesternGeco L.L.C., Houston, TX (US)

( * ) Notice: Subject to any disclaimer, the term of this patent is extended or adjusted under 35 U.S.C. 154(b) by 482 days.

(21) Appl. No.: 12/709,976

(22) Filed: Feb. 22, 2010

(65) Prior Publication Data

US 2011/0205845 A1 Aug. 25, 2011

(51) Int. Cl.
  G01V 1/28 (2006.01)
  G01V 1/26 (2006.01)
  G01V 1/02 (2006.01)
  G01V 1/24 (2006.01)
  G01V 1/143 (2006.01)
(52) U.S. Cl. .......................................... 367/55
(58) Field of Classification Search .................. 367/55, 367/23, 189, 190, 50; 181/111
See application file for complete search history.

(56) References Cited

U.S. PATENT DOCUMENTS

| 6,865,488 | B2 | 3/2005 | Moerig et al. |
| 7,050,356 | B2 | 5/2006 | Jeffryes |
| 7,639,567 | B2 * | 12/2009 | Sitton et al. ................... 367/189 |
| 7,885,143 | B2 * | 2/2011 | Laycock ......................... 367/56 |
| 2006/0155758 | A1 * | 7/2006 | Arnegaard et al. ....... 707/103 X |
| 2008/0008040 | A1 * | 1/2008 | Laycock ......................... 367/76 |
| 2009/0238038 | A1 * | 9/2009 | Bagaini et al. .................. 367/37 |
| 2009/0323472 | A1 | 12/2009 | Howe |
| 2011/0205845 | A1 * | 8/2011 | Quigley .......................... 367/50 |

OTHER PUBLICATIONS

Postel, et al., Reduced Vibroseis Cycle Time Technique Increases Land Crew Productivity, First Break, Feb. 2005, pp. 37-40, vol. 23.

* cited by examiner

*Primary Examiner* — Daniel Pihulic

(57) ABSTRACT

A technique includes monitoring acquisition activity of a plurality of seismic vibrators. The technique includes receiving signals from the seismic vibrators during the monitoring. Each of the signals indicates that at least one of the seismic vibrators is available for an associated seismic operation. The technique includes, in response to the signals, regulating the operations based on the monitored acquisition activity.

9 Claims, 5 Drawing Sheets

VIBROSEIS SEISMIC ACQUISITION TECHNIQUE

BACKGROUND

The invention generally relates to a vibroseis seismic acquisition technique.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes monitoring acquisition activity of a plurality of seismic vibrators. The technique includes receiving signals from the seismic vibrators during the monitoring. Each of the signals indicates that at least one of the seismic vibrators is available for an associated seismic operation. The technique includes, in response to the signals, regulating the operations based on the monitored acquisition activity.

In another embodiment of the invention, a technique includes communicating a signal to a source manager indicating that a seismic vibrator out of a plurality of seismic vibrators is ready to begin generating at least one seismic sweep. The technique includes receiving parameters of the seismic sweep(s) communicated by the source manager in response to the signal and generating the seismic sweep(s) based on the parameters.

In another embodiment of the invention, an apparatus includes a monitor and a sweep manager. The monitor tracks acquisition activity of a plurality of seismic vibrators. The sweep manager receives signals from the seismic vibrators during the monitoring. Each of the signals indicate that one of the seismic vibrators is available for an associated seismic operation. The sweep manager controls the operations based on the acquisition activity in response to the signals.

In yet another embodiment of the invention, an apparatus includes a communication interface and a sweep generator. The communication interface communicates a signal to a source manager indicating that a seismic vibrator out of a plurality of seismic vibrators is ready to begin generating at least one seismic sweep. The sweep generator receives parameters of the seismic sweep communicated by the source manager in response to the signal and generates the seismic sweep(s) based on the parameters.

Advantages and other features of the invention will become apparent from the following drawing, description and claims.

DETAILED DESCRIPTION

Figure 1:
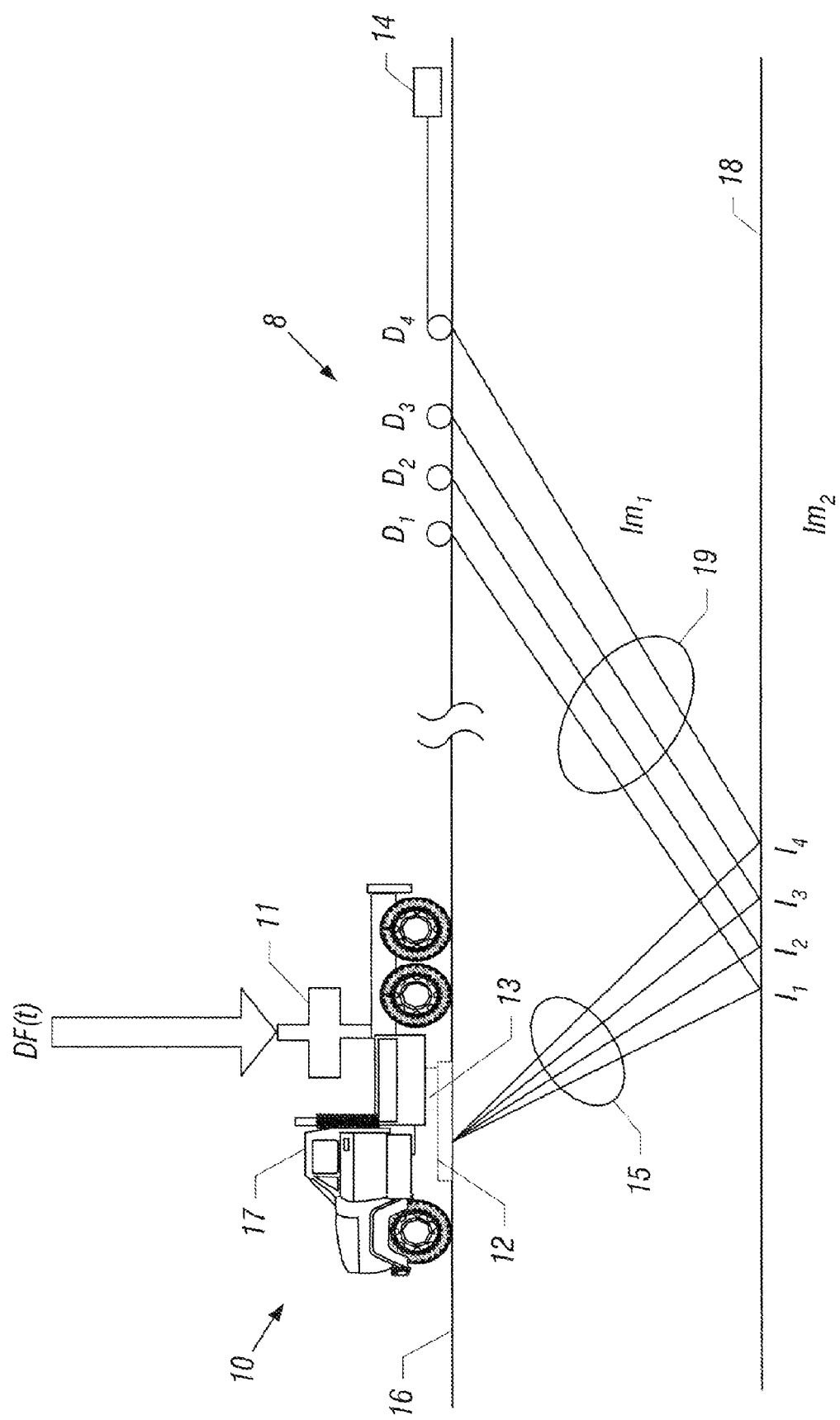
FIG. 1 is a schematic diagram of a vibroseis-based acquisition system.

Referring to FIG. 1, an exemplary land-based vibroseis acquisition system 8 in accordance with embodiments of the invention includes multiples seismic vibrators 10 (one of which is depicted in FIG. 1); surface-located geophones $D_1$, $D_2$, $D_3$ and $D_4$; and a data acquisition system 14. As part of operations associated with a vibroseis survey, each seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The geophones $D_1$, $D_2$, $D_3$ and $D_4$ also acquire measurements of other sweeps that are generated by the seismic vibrator 10 and sweeps that are generated by other seismic vibrators 10, as described further below. The data acquisition system 14 gathers the raw seismic data acquired by the geophones $D_1$, $D_2$, $D_3$ and $D_4$ and communicates the raw seismic data to a data processing system for purposes of determining information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep, the frequency of the DF(t) signal transitions (and thus, the oscillation frequency of the reaction mass transitions) over a range of frequencies, one frequency at time. The amplitude of the DF(t) signal may be linearly or non-linearly varied during the generation of the sweep pursuant to a designed amplitude-time envelope.

Among its other features, the seismic vibrator 10 may include a signal measuring apparatus 13, which includes sensors (accelerometers, for example) to measure the signal 15 (i.e., to measure the output ground force of the seismic vibrator 10). As depicted in FIG. 1, the seismic vibrator 10 may be mounted on a truck 17, an arrangement that enhances the vibrator's mobility.

It is noted that unlike the seismic vibrator 10, a seismic vibrator, in accordance with other embodiments of the invention, may alternatively be constructed to be located in a borehole. Thus, seismic sensors, such as geophones, may alternatively be disposed in a borehole to record measurements produced by energy that is injected by borehole-disposed seismic vibrators. Although specific examples of surface-located seismic vibrators and seismic sensors are depicted and described herein, it is understood that the seismic sensors and/or the seismic vibrators may be located downhole, in accordance with other embodiments of the invention.

Due to the mechanics and movement of the seismic vibrator 10, the overall time consumed in generating a vibroseis sweep significantly exceeds the sweep length, or duration, which is just one component of the overall time. For example, the overall time involved in generating a particular vibroseis sweep includes a time associated with deploying the base plate (such as the base plate 12 of the seismic vibrator 10 depicted in FIG. 1); the time to raise the base plate; and a time to move the seismic vibrator from the previous location to the location in which the sweep is to be injected. Therefore, for purposes of increasing acquisition efficiency, a vibroseis seismic acquisition system, in accordance with embodiments of the invention described herein, includes fleets of multiple seismic vibrators that generate multiple vibroseis sweeps in a more time efficient manner, as compared to, for example, generating all of the sweeps with a single seismic vibrator.

Care is exercised to ensure that the seismic vibrators are operated in a manner that permits separation of the corresponding sensed seismic signals according to the sweep that produced the signal (i.e., for purposes of source separation). One technique, called a "slip sweep technique," involves using multiple seismic vibrators to generate a succession of vibroseis sweeps and imposes a "slip time" between the beginnings of successive sweeps. The minimum slip time, called the "listen time," define the minimum time between the beginnings of successive sweep sequences such that the corresponding sensed seismic signals do not interfere in the time-frequency space. With the slip sweep approach, the measurements produced by a given sweep are recorded during the listen time before the next sweep begins.

In order for the above-described slip sweep technique to achieve optimal results, interference noise must be minimized. The interference noise may originate from the seismic vibrators of the same fleet, as well as from the seismic vibrators of nearby fleets. More specifically, contemporaneous operation of multiple seismic vibrators and/or fleets of seismic vibrators may result in an acquired dataset where the primary seismic signals overlap, or interfere, in the time-frequency space. For each individual source point location, the interfering energy represents an additive noise component relative to the seismic wavefield, which would be recorded if the source unit/fleet were operating on its own.

In general, there are three classes of interference noise: operational noise, signature noise and separation noise. Operational noise is the noise associated with the presence and movement of multiple seismic vibrator units/fleets at or near the seismic recording spread.

Signature noise originates with the procedure used to collapse the uncorrelated data. The signature noise is principally attributable to Klauder wavelet sidelobe levels and from errors in the estimates of the vibrator source signatures, which are used to deconvolve the uncorrelated data. Where correlation is performed using a replica of the vibrator pilot sweep signal, the signature noise is commonly referred to as "correlation sidelobes" and "harmonic distortion." The accurate measurement or estimation of the applied ground force signal and its subsequent use in the source signature deconvolution processing may mitigate the level of residual signature noise in the processed dataset.

Separation noise refers to, for any given source point, the noise occurring within the correlated record "listen time" associated with the primary seismic wavefield of other sources operating contemporaneously.

The productivity and data signal-to-noise ratio (SNR) available from slip sweep vibroseis operations (where the slip time is equal to the listen time) provides a benchmark against which other high productivity techniques may be judged. Increasing the vibroseis productivity beyond that theoretically available from optimum slip sweep operations requires the introduction of simultaneous sweeping methods and operational or processing techniques to mitigate separation noise. More specifically, to maximize crew productivity, each vibrator unit/fleet should commence its sweep sequence as soon as possible after the unit/fleet is ready at its assigned source point location. Furthermore, all systematic dependencies should be minimized, which may otherwise act to limit the total achievable productivity. When using a continuous acquisition system to acquire vibroseis data with multiple vibrator units/fleets that are operating contemporaneously, the total interference noise in the separated dataset should be minimized in some optimum manner specific to the operational circumstances in a given time period.

While in general the locations for source positions and the sweep control parameters to be used at those locations are pre-planned, the order and absolute timing of the acquisition depends on operational factors, such as terrain conditions, number of operational vibrator units/fleets, speeds of the units/fleets, etc. For any given source point location, the relative location and absolute timing of other vibrator units/fleets operating contemporaneously but independently are uncontrolled. Therefore, the interference noise in the correlated dataset appears to be randomized. In reality, the interference of multiple source units/fleets in a given time period is better described as "pseudo-randomized" given that there is full knowledge for all operational units of the relative locations, timings, sweep sequences and interactions.

Figure 2:
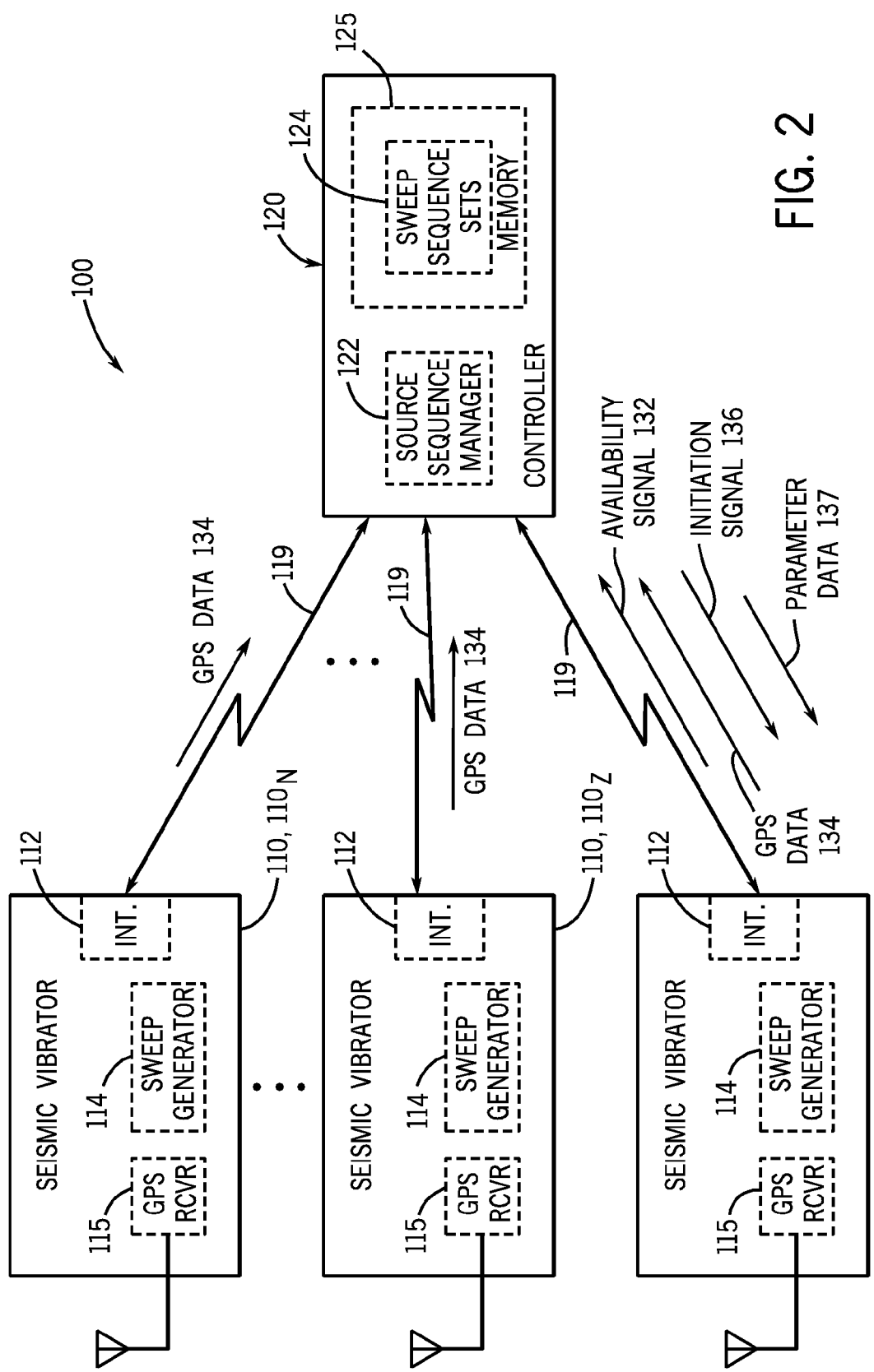
FIG. 2 is a schematic diagram of a vibroseis-based source system according to embodiments of the invention.

Referring to FIG. 2, in accordance with embodiments of the invention described herein, a vibroseis-based source system 100 may be used for purposes of maximizing crew productivity and maximizing the quality of the data acquired in a vibroseis survey. The source system 100 is used in conjunction with one or more sets of seismic sensors (geophones, for example), which are not depicted in FIG. 2; and a seismic data recording subsystem, which is also not depicted in FIG. 2.

The source system 100 includes N seismic vibrators 110 (i.e., seismic vibrators $110_1, 110_2 \ldots 110_N$), whose operations are monitored and regulated by a controller 120. Depending on the particular embodiment of the invention, the seismic vibrators 110 may be organized in groups, or fleets of vibrators, such that each fleet generates a particular set of orthogonal or "pseudo orthogonal" sweep sequences.

The controller 120 coordinates the sweep sequences generated by the seismic vibrators 110 in a real time fashion for purposes of mitigating separation noise. More specifically, the controller 110 includes a source sequence manager 122 that provides real time control of the vibrator sweep parameterization and absolute sweep start time assignments, either to the seismic vibrators 110 individually or in groups, with the objective of optimizing the signal-to-noise ratio (SNR) of the acquired data and minimizing the overall survey time.

Although represented in FIG. 2 as being a single unit separate from the seismic vibrators 110, depending on the particular embodiment of the invention, the controller 120 may alternatively be a distributed controller that is formed from multiple units; may be contained within one or more of the seismic vibrators 110; may be external to the seismic vibrators 110; etc. For the example that is depicted in FIG. 2, the controller 120 is a centralized controller 120, which communicates with communication interfaces 112 of the seismic vibrators 110 over wireless, bi-directional communication links 119 (as a non-limiting example).

Through the communication lines 119, the source sequence manager 122 monitors the ongoing seismic acquisition activity and receives availability signals 132 (such as the exemplary signal 132 from the seismic vibrator $110_1$ depicted in FIG. 2) from the seismic vibrators 110, which indicate when a seismic vibrator 110 or fleet of seismic vibrators 110 is available to generate another sweep sequence or a set of sweep sequences. Thus, a particular fleet of seismic vibrators may generate a set of sweep sequences, move up their base plates; move to the next vibrating point and then transmit an availability signal 132 to the controller 120, indicating the availability of the fleet to generate the next set of sweep sequences.

In accordance with embodiments of the invention, the source manager 122 also receives data (via the communication links 119) from the seismic vibrators 110, which are indicative of the precise locations of the vibrators 110. As a more specific example, in accordance with some embodiments of the invention, each seismic vibrator 110 may include a GPS receiver 115, which acquires the position of the vibrator 110 from GPS satellites and communicates corresponding GPS-derived location data 134 to the source sequence manager 122. The communication of the GPS data 134 may occur at preset times; may be triggered by predetermined events; may occur when a unit/fleet moves or moves by a predetermined distance; may occur continuously; etc.

By monitoring the timing of the ongoing activity, the availability of the seismic vibrators 110 and their positions, the source sequence manager 122 may select the next set of seismic vibrators 110 for a set of sweep sequences; determine the sweep parameters for the next set of sweep sequences; and determine and control when the next set of sweep sequences begins.

More specifically, the regulation of the sweep sequences by the source sequence manager 122 ensures that contemporaneously-generated sweep sequences are orthogonal or at least "pseudo" orthogonal. For example, each sweep sequence of a particular set of orthogonal sweep sequences may be varied in initial phase angles. Due to the selected phase angles, subsequent processing steps combine the acquired records and separate out the seismic wavefield contributions of each individual seismic vibrator or group of vibrators. In reality, the uncorrected differences in the operation of individual vibrators, ground coupling, etc., limits the achievable accuracy of the source separation resulting in some level of residual pseudo randomized interference noise in the separated dataset. However, the interference noise appears in the acquired seismic dataset in a manner, which allows its discrimination and attenuation by appropriate processing techniques.

In accordance with some embodiments of the invention, orthogonal and/or pseudo orthogonal sweep sequence sets are stored (as indicated at reference 124) in a memory 125 of the controller 120. Using this library, the source sequence manager 122 may take into account the ongoing seismic acquisition activity, the locations of the seismic vibrators 110, the particular seismic vibrators 110 available for sweeps, etc. and correspondingly select the appropriate sweep sequence set 124 so that the contemporaneously generated sweep sequences (generated by the same fleet and generated by nearby fleets) are orthogonal or pseudo orthogonal. Thus, when selecting the sweep sequence set for a particular fleet/unit, the source sequence manager 122 takes into account the orthogonality of all the contemporaneously generated sweep sequences (both the new set and the ongoing sets that could potentially interfere with the new set).

The source sequence manager 122 generates one or more initiation signals 136 that are received by one or more of the seismic vibrators 110 for purposes of beginning the next sweep sequence set. Along with this initiation signal 136, the controller 120 communicates parameterization data 137, which programs the seismic vibrator(s) 110 with the appropriate sweep sequences for the set.

Figure 3:
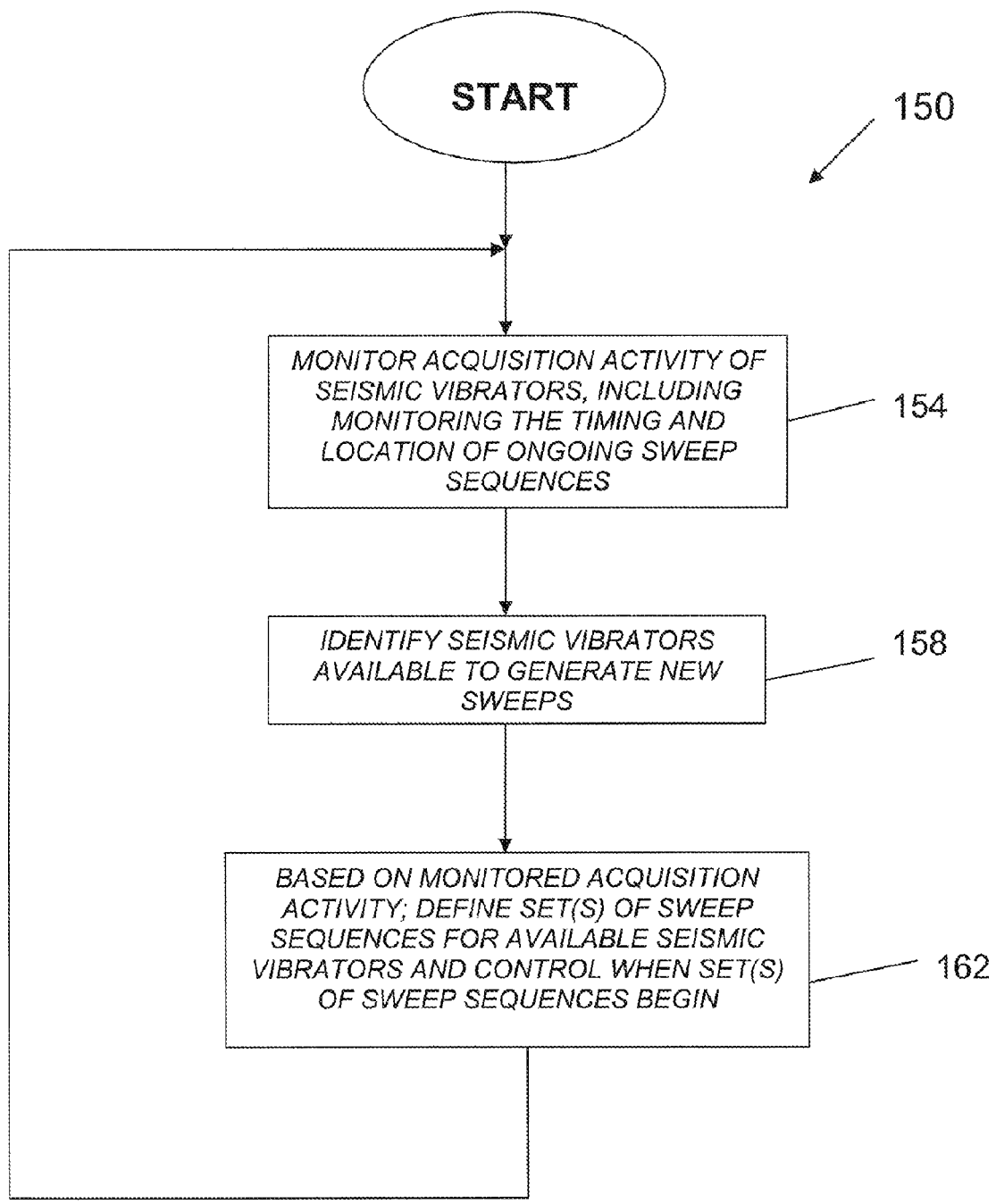
FIGS. 3 and 4 are flow diagrams depicting techniques to control sources in connection with a vibroseis survey according to embodiments of the invention.

Referring to FIG. 3, to summarize, in accordance with embodiments of the invention, a technique 150 includes monitoring (block 154) the acquisition activity of seismic vibrators, including monitoring the timing and locations of ongoing sweep sequences, and identifying (block 158) the seismic vibrators that are available to generate new sweeps. Based on the monitored acquisition activity, the technique 150 includes defining one or more sets of sweep sequences for available seismic vibrators and controlling when the set(s) of sweep sequences begin, pursuant to block 162.

Figure 4:
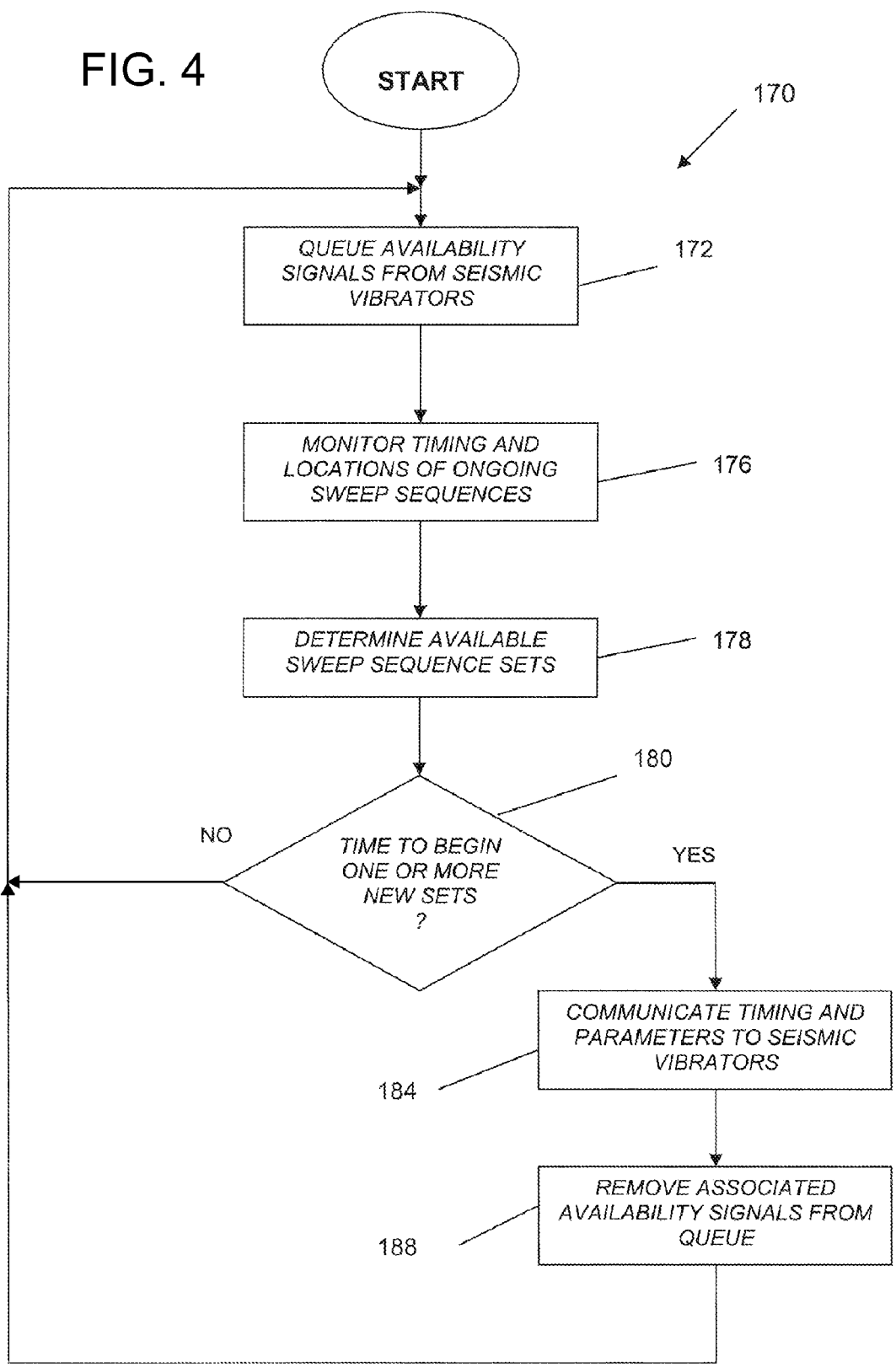

As a more specific example, FIG. 4 depicts a technique 170 that may be used by the source sequence manager 122 in accordance with some embodiments of the invention. Pursuant to the technique 170, the source sequence manager 122 queues (block 172) the initiation signals from the seismic vibrators and monitors (block 176) the timing and locations of the ongoing sweep sequences. Based on these parameters, the source sequence manager 122 determines (block 178) the available sweep sequence sets, such as by, for example, indexing the sweep sequence sets 124 based on the current monitored activity.

The source sequence manager 122 then determines (diamond 180) whether it is time to begin at least one set of sweep sequences. For example, this determination may be based on the availability of sweep sequence sets, a preset delay between the initiation of new sweep sequence sets, the criteria governing the number of sweep sequences involved in each set, etc. If it is not time for the at least one set of sweep sequences to begin, then control returns to block 172. Otherwise, the source sequence manager 122 communicates (block 184) the timing and parameters to the affected seismic vibrators, pursuant to block 184, and removes (block 188) the associated availability signals from the queue, pursuant to block 188, before control returns to block 172.

Figure 5:
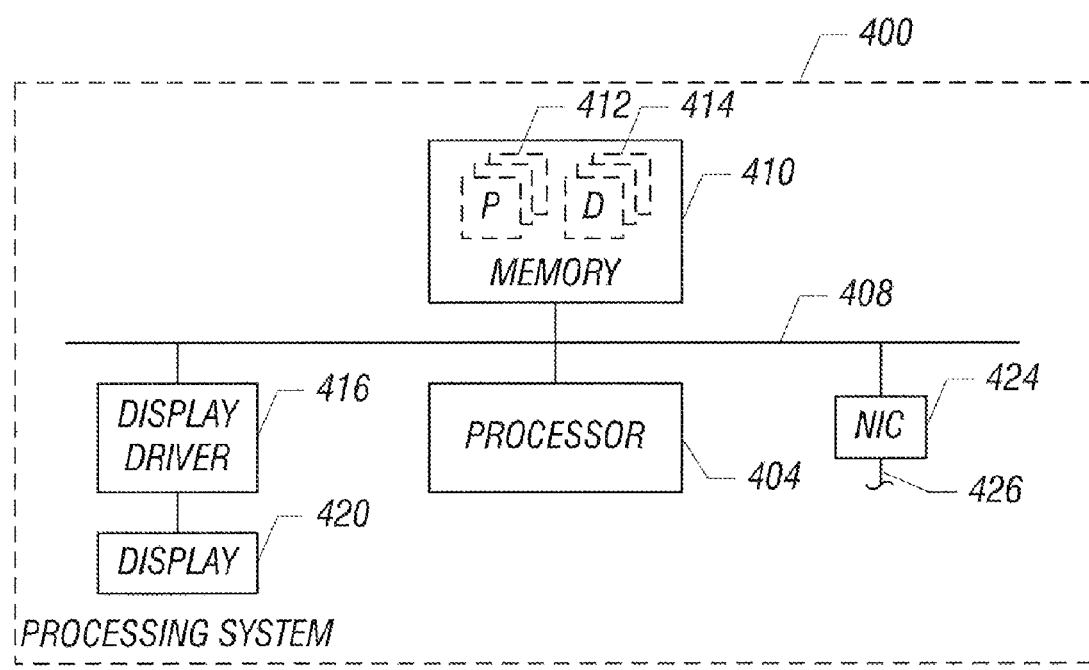
FIG. 5 is a schematic diagram of a processing system according to an embodiment of the invention.

In accordance with some embodiments of the invention, the controller 120 (see FIG. 2) and/or the control electronics for one or more of the seismic vibrators 110 may, in general, each have an architecture that is similar to the architecture of a processing system 400 that is depicted in FIG. 5. Referring to FIG. 5, in general, the processing system 400 may include at least one processor 404, such as a microcontroller and/or microprocessor.

In general, the processor 404 may be coupled through one or more buses 408 to a memory 410, which stores various programs 412 and datasets 414. Referring to FIG. 5 in conjunction with FIG. 2, for the case in which the processing system 400 forms the controller 120, the programs 412 may, when executed by the processor 404, cause the processor 404 to receive global positioning satellite (GPS)-based location data 134 from the seismic vibrators 110, receive signals 132 from the seismic vibrators 110 indicating availability of the vibrators 110 for operations, and possibly other data relating to the ongoing seismic acquisition activity. The programs 412 may also, when executed by the processor 404, cause the processor 404 to queue the availability signals and determine when a new set of sweep sequences is to begin. Furthermore, the programs 412 may, when executed by the processor 404, cause the processor 404 to select the sweep sequences for each sequence set based on the monitored seismic acquisition activity and the orthogonality or pseudo orthogonality of the contemporaneously generated set of sweep sequences that will be generated.

When the control electronics for the seismic vibrator 110 generally takes on the form of the processing system 400, the programs 412, when executed by the processor 404, may cause the processor 404 to interact with the corresponding GPS receiver 115 for purposes of acquiring GPS data indicative of the location of the seismic vibrator 110 and communicating this GPS data to the controller 120. Furthermore, the programs 412 may, when executed by the processor 404, cause the processor 404 to communicate an availability signal 132 to the controller 120 when the seismic vibrator 110 is available for a seismic operation, and the programs 412 may, when executed by the processor 404, cause the processor 404 to receive sweep parameters from the controller 120 and regulate the seismic vibrator 110 pursuant to the sweep parameters at a starting time specified by the controller 120.

Among its other features, the processing system 400 may include a display driver 416 that drives a display 420 for purposes of displaying the results of the processing by the processor 404. As examples, the display 420 may display time and/or frequency spectra of the acquired seismic measurements, as well as data indicative of the ongoing and scheduled sweep sequence sets. Additionally, as depicted in FIG. 5, the processing system 400 may include interfaces to communicate with other computer and/or processing systems, such as a network interface card (NIC) 424, which is connected to a network 426.

It is noted that FIG. 5 depicts merely an example of one out of many possible architectures for the processing system 400. Thus, many variations are contemplated and are within the scope of the appended claims. For example, in accordance with other embodiments of the invention, the processing system 400 may be a distributed processing system and thus, may include processing subsystems that are connected together and may be located at different locations.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
monitoring acquisition activity occurring due to at least some seismic vibrators of a plurality of seismic vibrators conducting ongoing seismic operations;
receiving a signal from at least one of the seismic vibrators during the monitoring, the signal indicating whether the seismic vibrator is available for an associated seismic operation; and
in response to the signals and the monitored acquisition activity, regulating at least one future seismic operation for the at least one available seismic vibrator, the regulating comprising determining parameters for the at least one future seismic operation to prevent the at least one future seismic operation from substantially interfering with the ongoing seismic operations.

2. The method of claim 1, wherein regulating the at least one operation comprises regulating a timing of the at least one operation.

3. The method of claim 1, wherein regulating the at least one operation comprises regulating sweep parameters of the at least one operation.

4. The method of claim 1, wherein the at least one operation comprises a plurality of seismic operations and regulating the at least one operation comprises beginning the plurality of operations at simultaneously the same time.

5. The method of claim 1, wherein the seismic vibrators are arranged in groups and monitoring the acquisition activity comprises tracking positions of each group and a timing of operations performed by the group.

6. The method of claim 5, wherein the act of tracking the timing comprises tracking a GPS time.

7. An apparatus comprising:
a monitor to track acquisition activity occurring due to at least some seismic vibrators of a plurality of seismic vibrators conducting ongoing seismic operations; and
a sweep manager to:
receive a signal from at least one of the seismic vibrators during the monitoring, the signal indicating whether the seismic vibrator is available for an associated seismic operation; and
in response to the signals and the monitored acquisition activity, regulate at least one future seismic operation for the at least one available seismic vibrator, the regulating comprising determining parameters for the at least one future seismic operation to prevent the at least one future seismic operation from substantially interfering with the ongoing seismic operations.

8. The apparatus of claim 7, wherein the sweep manager is adapted to control start times of the operations based on the monitored acquisition activity.

9. The apparatus of claim 7, wherein the monitor tracts a GPS timing of the operations.

* * * * *